United States Patent Office 3,502,149
Patented Mar. 24, 1970

3,502,149
SEALING COMPOSITION AND METHOD OF USE THEREOF
Samuel A. Pence, Jr., Tulsa, Okla., assignor to The Dow Chemical Company, Midland, Mich., a corporation of Delaware
No Drawing. Filed Apr. 7, 1967, Ser. No. 629,089
Int. Cl. E21b 33/138, 33/13; C08f 37/14
U.S. Cl. 166—295                    13 Claims

ABSTRACT OF THE DISCLOSURE

A sealant composition comprising an intimate admixture of a selected reducing agent, a small amount of water, a water-dispersible polymer, and a selected oxidizing agent, and use thereof. The strength and water-resistance of the composition made is especially suitable for sealing off underground openings.

---

The invention is in the field of plugging and sealing agents and compositions which may be emplaced while deformable, i.e. while in a flowable, moldable, or compressible state, in any of a variety of openings, voids, or spaces where such agent or composition autogenously is converted to a substantially fluid-tight solid composition which offers excellent resistance against deterioration as a result of contact with water. Such agents or compositions may be emplaced, while in the deformable state, in any opening existing between faces of solids, e.g., a gap, space, or break, which is desired to be closed off, as that existing: (1) between the face of an earthen formation and shoring, retaining wall, or supporting base, floor, or pavement; (2) between the face of an earthen formation and a well casing, tunnel liner, or mineshaft liner; (3) between opposing walls of an earthen formation, e.g., cracks, crevices, fractures, and faults; (4) between mating faces or edges of objects or articles of equipment such as those made of wood, stone, masonry, metal, plastic or the like to serve as a gasket or filler.

In Eilers et al. U.S. Patent 3,306,870; in patent applications S.N. 486,530, filed Sept. 10, 1965; S.N. 592,333, filed Nov. 7, 1966; and S.N. 563,679, filed July 8, 1966, all by Eilers and Parks, there are described novel compositions requiring specified polymers and methods of use thereof for plugging or sealing openings, particularly in geologic formations.

The present invention is an improvement over the compositions described in said patent applications, the improvement residing in providing a composition: which has particularly high resistance to deterioration by water or brines when contacted therewith for appreciable periods of time; which permits control over the flexibility or pliability thereof on the one hand and toughness and inflexibility, as desired, on the other hand; which permits control of resistance to loss of fluid from the composition after emplacement adjacent to a porous material and prior to setting of the composition to a solid; and which in general provides a long lasting and effective seal, when set, against fluid flow.

The invention broadly encompasses a composition, and use thereof, said composition being an intimate mixture comprising a selected water-dispersible particulate polymer, a selected solution-soluble reducing agent, and selected oxidizing agent which provides in situ an effective cross-linking agent for the polymer and water.

There may optionally be present a salt, a pH value control agent such as an acid salt, an acid, or an hydroxide, a particulated material, and/or an antifoaming agent, if such appears advisable.

The salt of a strong acid and weak base, when added, serves as an expedient for moderate lowering of the pH value. The metal portion of a salt may also serve as an auxiliary crosslinking agent for the polymer, particularly if it contains an oxidizable metal at a lower valence value, e.g. a ferrous salt. The particulated material imparts certain desirable physical properties such as (1) resistance to movement under pressure (a useful property when the composition is used for gaskets) and (2) lessening of fluid-loss prior to gelation of the composition when emplaced in openings in or adjacent to a porous geologic formation.

The anti-foaming agent serves its normal function of lessening surface tension and accelerating drainage of fluid from the liquid film entrapping gases to cause rapid collapse of gas bubbles.

Polymers for use herein are water-soluble or water-dispersible homopolymers and copolymers prepared by polymerizing ethylenic monomers to produce a polymer having an average molecular weight of a least about 10,000 comprising repeating units having the generic structure:

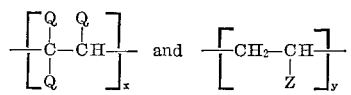

wherein, Q is independently selected from the class consisting of $CH_5$, H, Cl, CN, $C_6H_5$; and Z in independently selected from the class consisting of COOH, COOM, $CH_2COOH_3$, $CONH_2$, CONHR, and $CONR_2$, wherein R is a 1 to 4 carbon atom alkyl and M is selected from the class consisting of ammonium and alkali metals, and wherein $x$ is selected from the class consisting of 0 and integers up to, but exclusive of, such size as will render the polymer water-insoluble and wherein $z$ is selected from the class consisting of integers of such size as will render the polymer water-soluble and wherein $x$ and $y$ collectively are of sufficient size to provide the required molecular weight.

Herein the term water-soluble polymers will be used, in accordance with high polymer terminology, to include both those that are truly soluble and those that disperse to form stable colloidal suspensions.

Illustrative of polymers useful herein include the various homopolymers and copolymers of acrylamide and methacrylamide, e.g. as described in U.S. Patents 2,625,529; 2,740,522; 2,729,557. They also include polyacrylic acid and polyacrylates, e.g. as described in Kirk-Othmer Encyclopedia of Chemical Technology, vol. 1 (1963, second edition, pages 305 et seq., published by Interscience Publishers, Inc., New York. Other polymers useful herein are the various water-soluble or water dispersible copolymers of various N-substituted acrylamides such as N-methyl acrylamide, N-propyl acrylamide, and N-butyl acrylamide at various stages of hydrolysis of the carboxamide groups to carboxylic groups. Still other monomers from which useful polymers can be prepared for use in the practice of the invention are the amides and half amides of maleic, fumaric, itaconic, and crotonic acids. In general, any ethylenically unsaturated polymerizable monomer, which contains sufficient

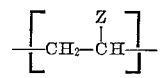

groups may be employed to prepare water-soluble or water-dispersible homopolymers and copolymers useful in the invention. It can be seen that polymers useful herein include acrylamide polymers wherein from none to 100 percent of the carboxamide groups are hydrolyzed to carboxyl groups.

Other polymers useful herein are those prepared by limited cross-linking of selected monomers or straight chain polymers. Such cross-linking can be achieved by irradiation or by chemical means such as by incorporation of a small amount, e.g. up to 1% by weight, of a polyfunctional vinyl crosslinking monomer, into the polymerization receipe. Examples of such crosslinking polyfunctional monomers are methylenebisacrylamide, divinylbenzene, vinylether, divinylether, and the like. An acceptable polymer must be either water soluble or be dispersible and gelable in the aqueous solution.

Monomers that may be copolymerized with the monomers contributing the required

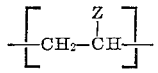

groups to prepare water-soluble or colloid-forming copolymers acceptable in the practice of the invention, are vinylpyrrolidone, vinylmorpholinone, vinyloxazolidinone, vinylalkyloxazolidinones, vinyltoluenesulfonate, vinylbenzylsulfonate, styrene sulfonate, and monomeric mixtures of such monomers, and maleic anhydride so long as the copolymer so made is sufficiently water-soluble, i.e., at least about 20 percent of the available sites along the polymer chain are Z groups.

Methods of preparing acrylamide type homopolymers and copolymers for use in the practice of the invention are known. They are most commonly prepared by reacting the corresponding selected ethylenic monomers in the absence of a solvent or preferably in an aqueous medium in the presence of a free-radical promoting polymerization catalyst, e.g., a peroxide or persulfate, or by subjecting the monomeric mixture to irradiation, e.g., that produced by a cobalt-60 isotope or as produced by bombardment with high energy electrons such as can be produced by a Vandegraaff election accelerator. The polymer when formed in a liquid medium is separated from the reaction medium by filtration, centrifugation, or by other known techniques usually followed by drying. Merely drying the reaction mixture containing the polymer is often sufficient to remove the reaction medium.

When a sulfonated polymer is desired, sulfonation may be effected by the use of such agent as $H_2SO_4$ or $SO_3$. Either the monomer may be sulfonated, (i.e. sulfonation done prior to polymerization or the polymer may be sulfonated. Where a water-dispersible salt form of the polymer is desired, the polymer may be neutralized by use of an aqueous solution of a suitable hydroxide, e.g., NaOH.

The molecular weight of the polymer employed is not highly critical so long as the polymer produced, as aforesaid, either dissolves or forms a colloidal suspension. The preferred molecular weight of the polymer accordingly varies with the polymer selected. In general, a water-dispersible synthetic polymer having a molecular weight of at least about 10,000, and preferably at least 100,000 is recommended. The upper limit of molecular weight is unimportant so long as the polymer is water-soluble or disperses; molecular weights of over 10,000,000 may be used so long as the resulting composition can be pumped.

The minimum limitation of the molecular weight of an acceptable polymer may be conveniently ascertained by obtaining the viscosity of a 2 percent aqueous solution thereof. If the viscosity of such solution is at least 8 centipoises, the molecular weight is acceptable.

The particle size of the polymer is acceptable over a wide range of mesh size. Best results are obtained by comminuting the polymer to a size of between about 20 and about 325 mesh, preferably, between 40 and 200 mesh, U.S. Bureau of Standards Sieve Series. The gelation rate of the resulting composition prepared by employing a finer mesh polymer is generally faster than that obtained when employing a coarser mesh polymer.

The amount of polymer employed depends both upon the type selected and the particular use to which the composition is to be put. From about 0.1 to about 8.0 pounds of polymer per gallon of total liquid present in the composition (from about 12 to 960 grams of polymer per liter of total liquid present may be employed. Preferably a composition containing between about 1 and 7 pounds of polymer per gallon of liquid is preferred.

The amount of polymer employed is recommended to be greater where a hard or tough final composition is desired. Contrariwise, where a said composition which is deformable or flowable under pressure is desired, a lesser amount of polymer is employed.

The oxidizing agent to employ is a solution-soluble hexavalent chromium compound, i.e. one wherein the valence state of the chromium compounds, as added, is +6.

A relatively small amount of the oxidizing agent is all that is necessary. An effective amount may be provided by as little as 0.001 percent by weight, based on the polymer present. The end product made, even when employing such small amount, shows clearly improved resistance to tear and to degeneration by contact with water or a brine. Recommended amounts of the oxidizing agent to employ are between about 0.01 and 5.0 percent, based on the weight of the polymer present in the composition. Amounts as large as 10% are usable in some cases, if excessive crosslinking does not ensure.

The solution-soluble reducing agent to employ is a polyhydric alcohol, illustrative of which are alkylene glycols, polyoxyalkylene glycols (sometimes called polyglycols), and glycerol.

To insure intimate contact of the starting or hexavalent chromium compound with the polymer in solution, it is necessary for this compound to be solution-soluble, at least to the extent necessary to effect the subsequent gelation as explained below. By this, it is meant that this starting chromium compound must be soluble in the particular aqueous solution which is to be mixed with the polymer to prepare the gelation mixture and which may also contain an acid or other ingredient. The terms solution-soluble and soluble are sometimes used herein as aforesaid, in accordance with standard art-recognized technology, and therefore refer to both true solutions and colloidal solutions, since the essential requirement is sustained intimate contact with the polymer, which can be accomplished in either a true solution or in a colloidal solution.

Such solution-soluble chromium compounds include, chromic acid (sometimes called chromic oxide), sodium chromate, potassium chromate, sodium dichromate, potassium dichromate, and other water-soluble chromates and dichromates.

One embodiment of the invention employs one or more inorganic salts of metals, e.g. Al, Zn, and Mg, having an electrochemical potential above that of chromium, i.e. above −1.33 v., in the electromotive series. The incorporation in the gellable mixture of such salts is particularly helpful in the preparation of the composition of the invention where a tough durable end product is desired. One or more of the following salts is suggested to be used for such tough durable composition: $FeCl_2$, $TiCl_3$, $SnCl_2$, $ZnC_2H_3O_2$, $FeSO_4$, $ZnCl_2$, or $Zn(NO_3)_2$, or mixtures of any such salts in combination.

Some advantages are obtained when the pH value of the fluid composition is on the acid side. Accordingly, the pH value thereof is often lowered to a value of from 4 to 6 by the use of such acid salts as $AlCl_3$, $FeCl_3$, or $CaCl_2$, or by the addition of an acid, e.g., HCl, $H_2SO_4$, $HNO_3$, $H_3PO_4$, $H_3BO_3$, or acetic, tartaric, oxalic, citric, sulfamic or other acid. Dilute HCl or $H_2SO_4$ aqueous acid solutions are most often used.

A further embodiment of the invention employs an auxiliary reducing agent consisting of a pulverulent metal above H in the electromotive series, e.g. Mg, Al, or Zn. Between about 0.01 and 2.0 percent by weight of polymer is recommended.

The solution-soluble reducing agent converts the hexavalent chromium compound into a gelation compound which yields chromium ions in situ having a valence state of +3 which crosslink the water-dispersible polymer. The reducing agent is substantially inert in the solution in the absence of the hexavalent chromium compound. The reducing agent converts the hexavalent chromium compound to the gelling or crosslinking compound at a rate sufficiently slow that the hexavalent chromium compound and the reducing agent can be uniformly distributed through the solution before the noticeable onset of gelation. A period of time, before the composition gels, of 15 to 30 minutes, after the hexavalent chromium compound and reducing agent have come into intimate contact in the solution, is recommended.

Chromium compounds, wherein chromium having the valence of +3 have been introduced (directly added), have been used heretofore as starting compounds to crosslink water-dispersible polymers as, for example, in U.S. Patent 3,114,651. However, such chromium compounds having a valence of +3 when added do not give a gelled polymer composition having the desired properties of toughness and resistance to deterioration or dissolution by aqueous fluids required to provide the longer lasting more effective seal to fluid flow provided by the compositions of the present invention.

Chromium compounds wherein chromium has the valence state of +6 have been used heretofore with polyvinylalcohol in the presence of sulfur-containing reducing agents, as described in U.S. Patent 3,265,657. However, polymers so produced have unsatisfactory resistance to deterioration. When in contact with water, they were tacky and had a gelatious consistency, exhibiting very low strength properties of the nature of edible gelatin. They are not suitable for attainment of the objectives of the instant invention.

In the practice of this invention, either the starting chromium compound (i.e. hexavalent chromium compound) or the reducing agent may be added to an aqueous solution or dispersion of the polymer mixture followed by the other, or the two may be added simultaneously, as may be desired. If preferred, the starting compound of chromium, i.e. wherein the chromium in the compound has a valence state of +6, may be dissolved in the aqueous phase; to this may be added the liquid polyhydric alcohol or mixture thereof and thereafter the selected specified polymer may be added thereto, accompanied by vigorous stirring to give a homogeneous dispersion. If the reducing agent includes a solid, i.e. zinc dust or the like, then it advisedly is intimately premixed with the solid polymer and thereafter the resulting dry mixture simultaneously added to the aqueous solution containing the hexavalent chromium compound. Alternately, the reducing agent and the oxidizing agent can both be dissolved in separate aqueous solutions and the respective solutions mixed together prior to addition of the polymer. Care must be exercised when the polymer is premixed with the oxidizing agent that a heterogeneous system does not result which tends to prevent intimate contact between the reducing agent and the hexavalent chromium compound.

After intermixture of the polyhydric alcohol reducing reagent, aqueous polymer solution, and the aforedescribed hexavalent starting chromium compound, a redox reaction occurs by which the chromium compound yields chromium +3 ions which in turn effect crosslinking of the water-dispersible polymer to produce the gelled sealant or gasket material of the invention.

The newly formed or nascent chromium +3 ions effect rapid crosslinking of polymer molecules upon contact therewith. Therefore, as the reducing reagent begins to react with the starting chromium compound, the gelation proceeds very rapidly, resulting in forming gels shortly after the onset of gelation, even though the redox reaction is not completed. Consequently, this invention provides practitioners of the art with a new technique for gelation of aqueous polymer solutions which permits the gelation agents to be mixed into a polymer mixture which then remains completely fluid for sufficient time to permit emplacement into any of a variety of openings, voids, or spaces where such composition is converted to a substantially fluid-tight solid composition.

In the practice of this invention, the hexavalent chromium compound should be employed in an amount sufficient to cause the subsequent gelation of the solution due to the reduction of the chromium +6 compound to the chromium +3 compound. The precise lower limit of the concentration of the chromium +6 compound depends primarily upon the particular type of polymer used, the concentration of the polymer in the aqueous mixture, and the strength or firmness of the ultimate gel which is desired. Generally the hexavalent chromium compound must be used in an amount equivalent to at least about $3 \times 10^{-4}$ gram atom of chromium per gram atom of polymer, and in most instances, it is preferred to use the hexavalent chromium compound in an amount equivalent to at least about $5 \times 10^{-4}$ gram atoms of chromium per gram atom of polymer. There is no actual critical upper limit on the concentration of the hexavalent chromium compound. However, it should be noted that the strength or firmness of the gel is directly proportional to the amount of chromium +3 ions produced which crosslink the polymer. Such production of excess amounts of the chromium +3 ions usually causes a shrinkage of the resulting gel which can squeeze water out of the gel. In many instances this result is immaterial, but where such a result is undesirable, the preparation of a test sample is suggested to ascertain the operable concentration of the hexavalent chromium compound to be added to the aqueous polymer mixture.

The amount of the reducing agent to be added to the aqueous polymer mixture depends to some extent upon the concentration of the hexavalent chromium compound to be used. A sufficient amount of the reducing agent should be provided to insure contact thereof with the hexavalent chromium compound in the aqueous polymer mixture to generate an amount of chromium +3 ions which is effective to gel the solution at the rate desired.

Although some water is always required to be employed in the practice of the invention, such amount may be very small, e.g., less than 1% of the total liquids employed. Often an adequate amount of water is provided by using technical grade glycerol or a glycol, both of which (being hygroscopic) contain from about 1 to 5% of water dissolved therein. Twenty percent of water based on the weight of total liquids present marks the maximum amount of water employed in the invention under normal circumstances. From about 3% to about 12% of water, based on the total weight of liquid present, is the more common range. In general, the larger the ratio of water to the polyhydroic compounds present, particularly when such compounds are principally glycerol or higher molecular weight polyglycols, the faster the rate of gel of the composition and, in general, the less flexible the final composition.

Some polyglycols, as aforesuggested, are commonly employed, replacing some of the glycerol, simple glycols, and/or water. The polyglycols, e.g., polyoxyethylene glycol, having an average molecular weight of between about 200 and 2,000, or polyoxypropylene glycol, having an average molecular weight of between about 400 and 4,000, are most commonly used. Illustrative of the polyglycols are diethylene glycol, triethylene glycol, dipropylene glycol, and tripropylene glycol. The higher the molecular weight and the higher the proportion thereof present in the fluid composition of the invention, the slower the rate of gel.

Where high ambient temperatures are encountered in the or opening into which the fluid composition is to be emplaced and set, the higher proportions of the higher molecular weight polyglycols are recommended. Also, where a soft final set composition is preferred, such higher molecular weight polyglycols are employed in increased proportions of the total liquid present.

The ambient temperature during the preparation and employment of the invention in the fluid state is highly important. The higher the ambient temperature, the faster the rate of gelation of the composition. Where a typical fluid composition gels in 0.25 hour at 150° F. and in about 0.5 hour at 120° F., it requires 2.5 hours to gel at 80° F. Accordingly, the selection and ratio of components within the purview of the invention are made carefully in view of the conditions under which the composition is to set to a solid, as for example in a subterranean formation having a relatively high temperature.

In some instances, as above suggested, it is recommended that a trial sample be prepared and allowed to set to a solid under circumstances affording convenient observation, at about the temperature of the formation, prior to emplacement and actual sealing off of the opening in the formation, thereby to provide a basis for adjusting the components of the composition employed which will be best suited to the conditions of use in the formation.

The polyhydric alcohol employed in the invention usually consists of a mixture of glycols and glycerol although only either a glycol or glycerol is essential. However, advantages usually exist where a selection of relative amounts of both glycerol and one or more glycols is exercised. The glycols contemplated include both the alkylene glycols or simple glycols and higher molecular weight polyoxyalkyleneglycols or polyglycols.

The higher the ratio of water to the polyhydric reducing agent present, the faster the gel and the more rigid, i.e. less flexible, the gelled composition.

When the water is held constant and particularly on the low side and the following other conditions are provided, the results set out below prevail:

Where the polyhydric reducing agent consists only of a simple glycol and a polyglycol, e.g. ethylene glycol and either or both diethylene glycol or triethylene glycol, the rate of gelation is correspondingly slow. The resulting gelled composition is increasingly tough and less flexible, the greater the ratio of the simple glycol to the polyglycol.

Where the polyhydric reducing agent consists only of a simple glycol and glycerol, a faster gel rate and tougher gelled composition results as the ratio of the simple glycol is increased.

Where the polyhydric reducing agent consists only of a polyglycol and glycerol, a relatively faster gel rate and relatively tougher, less flexible composition result as the ratio of glycerol in increased, although the rate of gelation is much slower and the final gelled product much more flexible than when an appreciable amount of a simple glycol is present.

By the judicious selection of relative amounts of water, simple alkylene glycol, polyglycols, and glycero, the quality of hardness or toughness on one extreme and flexibility or softness on the other of the gelled product can be controlled and, thereby specific needs can be met.

Although not essential, it is recommended that some glycerol be used in the practice of the invention. The recommended amount varies from about 1 or 2% to as high as 99.5%, by weight of the total liquid present. (When the glycerol is extremely high the balance of the liquid must be water.) The maximum amount of glycerol for the preparation of a composition for normal use varies from about 20 to 70% by weight of the total liquid present. The higher percents of glycerol are used in preparing a softer gelled polymer composition or when employed with relatively high percents of water or with relatively low percents of polyglycols.

For a number of uses of the composition of the invention, e.g., when the liquid composition is to be emplaced in contact with the face of a porous geologic formation, as in cementing off spaces or annuli of wellbores, it is recommended to admix a fluid-loss agent with the liquid components of the composition. Such agents include finely pulverulent $Al_2O_3$, $SiO_2$, $BaSO_4$, pumice, or perlite of less than 44 microns in size and preferably having an average particle size of not over about one micron. Other fluid-loss agents prepared from naturally occurring materials may also be used as, for example, ground apricot pits, ground walnut shells, and the like. Up to about 10% of the fluid-loss control agent, by weight of the polymer present, is recommended.

Although the composition of the invention usually exhibits no tendency to excessive foaming, if such tendency to foam is observed, known foam inhibitors may be mixed therewith, e.g., silicone oils or a "diol" type of block copolymer of poly(oxypropylene-poly(oxyethylene)-glycol, having a molecular weight in the range of between about 1,000–2,800, in a small but effective amount, e.g., between about 0.001 and 0.10% by weight, based on the total weight of the composition.

The addition of a biocide or bactericide may be desirable where the set composition may be exposed to attack by biologically active organisms as, for example, bacteria, fungi, mould, and the like. Among the preferred biocides which may be used if desired are 2,3,5,6-tetrachloro-4-methylsulfonyl pyridine, 10,10′-oxybisphenoxarsine, the chlorinated phenols and their salts, and other biccidal compounds known to those skilled in the art.

The composition of the invention is preferably prepared as follows:

The glycerol, glycol, and/or polyglycol (only one of which must be present), and the water are first mixed together. If an aqueous solution of an inorganic salt and/or when pH adjustment agent, e.g., an aqueous HCl solution, and/or an antifoaming agent, (when deemed necessary) are employed, they also are usually dissolved in the water and the resulting aqueous solution then admixed with the glycerol-glycol-water mixture, the amuont of water being added from the two sources being considered in calculating the total water.

The particulate polymer is then admixed with the liquids, containing the salt or other optional ingredients, e.g. pulverulent reducing metal, when used. If a fluid loss control additive is deemed advisable, e.g., finely pulverized, $SiO_2$, $Al_2O_3$, or $BaSO_4$, it may be slurried into the composition at any convenient stage, i.e., it may be blended in a dry state with the particulate polymer and thereafter slurried with the liquids. Commonly it is added to the otherwise completed composition as it is being injected down a well-bore or otherwise conveyed along a conduit to the locus where it is desired that it be employed.

The process of the invention is carried out by emplacing the composition, prepared as described above, while in the fluid state, into a void, cavity, or space where a seal against fluid flow is desired. Such uses include providing seals in general, for example gaskets in water lines and plugs in geologic formations. After emplacement, the composition gels autogenously to a firm substantially fluid-tight seal.

Injection of the fluid composition into the opening may be done by usual transfer equipment useful for fluids, e.g., pumps or compressed air, properly connected with suitable tanks and piping equipment, often conveniently connected to a mixing apparatus which receives the various ingredients from sources thereof.

The following examples are illustrative of the invention:

The ingredients set out below were admixed and the composition so made tested for viscosity, gel time, and strength at specified temperatures. The viscosity is given in centipoises, the gel time in minutes, and strength values in p.s.i., as ascertained according to ASTM Test D412–64T.

EXAMPLE 1

50 grams of linear polyacrylamide, having an average molecular weight of between 1,000,000 and 2,000,000 were admixed with 50 milliliters of the following liquid mixture: 22.5 milliliters of glycerol, 22.5 milliliters of triethylene glycol, and 5 milliliters of water. To the polymer-liquid mixture there was then added 0.1 gram of $Na_2Cr_2O_7 \cdot 2H_2O$.

The composition so made was poured onto a smooth surface and gelled over a warm water bath at a temperature of 140° F. After about 10 days, the product was a strong flexible solid having a tensile strength value of 120 p.s.i.

EXAMPLE 2

The first example was repeated employing the same materials and procedure, except that the amounts employed were as follows: 60 grams of the linear polyacrylamide; 100 milliliters of a liquid mixture consisting of 76 milliliters of triethylene glycol, 16 milliliters of ethylene glycol, 8 milliliters of water and 0.06 gram of $Na_2Cr_2O_7 \cdot 2H_2O$. The composition was gelled similarly to the procedure employed in Example 1 above and the gelled product tested as above. It showed a tensile strength value of 100 p.s.i. after aging for 10 days.

EXAMPLE 3

This example was conducted similarly to the examples above except that the following amounts were employed: 30 grams of the linear polyacrylamide, 22 milliliters of glycerol, 22 milliliters of diethylene glycol and 6 milliliters of water. With this mixture was admixed 0.05 gram of $Na_2Cr_2O_7 \cdot 2H_2O$. The composition so made was poured onto a smooth surface and cured under an infra-red light. The temperature of the product during cure was about 50° C. It cured to a solid in 30 minutes. The product so made was tested and showed a strength value of 100 p.s.i. after being left to cure for one day at room temperature of approximately 75–80° F.

EXAMPLE 4

This example was conducted similarly to those above except that the following mixture was employed: 75 grams of the linear polyacrylamide, 44 milliliters of glycerol, 44 milliliters of diethylene glycol, and 12 milliliters of water. The amount of $Na_2Cr_2O_7 \cdot 2H_2O$ present was 0.8 gm. The composition so made was poured into a ring shaped configuration and pre-cured for 60 minutes at a temperature of 50° C. by an infra-red light. The composition was then further aged one day at room temperature and was then tested for strength properties. A segment having a 1-inch square cross-section was incorporated as a gasket within a metal flange. This gasket composition was subjected to a differential hydraulic pressure of 100 p.s.i., utilizing water as the hydraulic fluid, the gasket successfully withstood the pressure without leakage around the seal and without detrimental effect upon the composition of the seal.

EXAMPLE 5

Seventy milliliters of triethylene glycol, 30 milliliters of ethylene glycol, 10 milliliters of water, 1 gram of sodium dichromate dihydrate, 60 grams of particulated polyacrylamide, and 1 gram of zinc dust were mixed together. The resulting mixture was divided into three substantially equal portions, identified as Samples A, B, and C. Sample A stood at room temperature (about 75° F.) for 1 day. At the end of that time, it had formed a weak gel. Sample B was heated to 115° F. It changed to a dark green gel in an hour and after 24 hours it was a blue-gray colored solid having the general appearance and tough resilient nature of rubber. Sample C was treated by admixing therewith dilute sulfuric acid to result in a pH value of 6. The composition gelled, within about 15 minutes, to a blue-gray colored solid of the nature of that produced in Sample B above.

EXAMPLE 6

Example 5 was repeated in part, differing however in that dilute sulfuric acid was used instead of the water in the preparation of the composition. The rate of gelation was accelerated by the acid, the blue-gray solid forming within about five minutes after addition, to the triethylene glycol-ethylene glycol-aqueous acid solution, of the zinc dust and polymer mixture.

A portion of the resulting gelled solid was placed in a dish of water. After 24 hours, slight swelling of the polymer was observed. However, a viscosity value of the water indicated no significant increase, showing that no appreciable dissolution of the polymer had occurred.

Further tests on other portions of the polymer showed it to be resistant to the flow of water through a conduit in which a piece of the polymer was inserted. Tests showed it to be of high strength, tough and completely free of tackiness.

EXAMPLE 7

Nineteen milliliters of glycerol, 76 milliliters of diethylene glycol, 5 milliliters of water and 0.6 gram of $Cr(NO_3)_3 \cdot 9H_2O$, 60 grams of polyacrylamide, and 0.1 gram of zinc dust were mixed together. The pH value was 6. The temperature was raised to 115° F. After about 1½ hours, the slurry gelled to a gray solid material. After standing for 24 hours, the material was examined. It could be readily crumbled on the outside and was tacky on the inside. It was not sufficiently resistant to the flow of water when tested to be desirable as a sealant or plug.

EXAMPLE 8

Eighty-six milliliters of diethylene glycol, 14 milliliters of water, 75 grams of polyacrylamide, 50 grams of pulverized silica (silica flour), 0.1 gram of zinc dust, and 0.75 gram of sodium dichromate were mixed together.

The resulting mixture gelled within 10 minutes to a blue-green solid which was weak. The weakness was due to the rather large amount of silica flour and to accelerated crosslinking before adequate mixing, due in part to the relatively large amount of hexavalent chromium and the supplemental zinc dust reducing agent.

EXAMPLE 9

An aqueous solution of 0.468 gram of $Na_2CrO_4 \cdot 4H_2O$ in 5 mililters of 3% $H_2SO_4$ and a separate solution of 0.948 gram $Na_2S_2O_3 \cdot 5H_2O$ in 10 milliliters of water were added to 85 milliliters of a 1:4 volume mixture of glycerol:diethylene glycol, to which was thereafter added 60 grams of polyacrylamide of the type used in Example 8. The resulting mixture was stirred thoroughly to make a uniform dispersion. The dispersion had an initial pH of 6. A pea-green gel formed within 5 minutes, which further gelled 30 minutes after initial mixing to give a material with rubber-like consistency, i.e. it was tough, resilient, and resistant to water. The color of the gelled solid was a uniform pea-green throughout, and the composition was found by standard tests to be water resistant.

EXAMPLE 10

The above example was repeated, except that the $Na_2CrO_4 \cdot 4H_2O$ was dissolved in 5 milliliters of $H_2O$ instead of in 5 milliliters of 3% $H_2SO_4$. The slurry had an initial pH of 8. The slurry gelled more slowly than the composition of Example 6 to give a sticky or tacky material. After approximately 1 hour, the composition had turned green in color and was found to be even more water-resistant than the set product of Example 9.

EXAMPLE 11

To 85 milliliters of propylene glycol and 15 milliliters of water, in which 0.6 gram sodium dichromate had been dissolved, were added 60 grams of polyacrylamide of the type used in examples above. This slurry slowly turned pea-green. After aging 3 days at ambient temperature, a dark green, very strong, rubber-like, and water-resistant solid had formed. A portion of this solid, upon immersion in water, imbibed water and swelled without dissolving in an excess of water.

EXAMPLE 12

0.1 gram of sodium dichromate and 0.1 gram of zinc acetate were dissolved in 15 milliliters of water. This solution was mixed with 85 milliliters of diethylene glycol. A slurry was then made of the above fluid and 60 grams of polyacrylamide at ambient temperture.

This slurry was cured 30 minutes at 140° F. A strong, water-resistant, rubber-like material which swelled in water without dissolving therein was formed.

EXAMPLE 13

A fluid consisting of 15 milliliters of water plus 0.75 gram of sodium dichromate plus 17 milliliters of glycerine and 68 milliliters of diethylene glycol was slurried with 75 grams polyacrylamide and 50 grams of silica flour (passing 325 mesh sieve) at 60° F. After curing one day at 60° F., a strong rubber-like material suitable for a water-sealing gasket was formed.

EXAMPLE 14

Ten millimeters of water containing 0.06 gram of chromium trioxide ($CrO_3$) were added to 90 milliliters of a 1:4 (by volume) mixture of glycerol and diethylene glycol. The fluid immediately began to change from an orange color to a brown color. Within one minute, 60 grams of polyacrylamide were added to the above described fluid. The slurry quickly turned pea-green. The initial pH was 6.6. After ageing 1 hour at room temperature, a rubber-like water-resistant, solid formed.

EXAMPLE 15

Twelve milliliters of water containing 0.06 gram $CrO_3$ were added to 88 milliliters of 1:4 glycerine-diethylene glycol. Sixty grams of polyacrylamide were then admixed therewith. The slurry was similar to that described above, but set faster requiring only 0.5 hour to form a rubber-like solid.

EXAMPLE 16

Compositions prepared in Examples 14 and 15 were contacted with equal volumes of water. Immediate gelation was effected forming rubber-like solids of firm, strong and water-resistant nature.

EXAMPLE 17–20

The sodium salt of polyacrylic acid polymer[1] of an average molecular weight of about 150,000 was prepared according to the general descriptive material in the Kirk-Othmer reference, sic. Employing the above made polymer, tests were performed according to the following procedure: The polymer was slurried in the water. The polyhydric compounds, viz, glycol and diethylene glycol, were mixed together and the sodium dichromate admixed therewith. The aqueous dispersion of polymer and the polyhydric compounds containing the dichromate were mixed together with rapid stirring. The entire mixing operation consumed less than 3 minutes. The mixture so made was poured into a ½" x 1" x 3" mold, where it gelled to a solid as described hereinafter.

The amounts of each ingredient are shown below:

| Identification | Milliliters of Water | Polyacrylic Acid Polymer in Grams | Glycerol in Milliliters | Diethylene Glycol in Milliliters | Sodium Dichromate in Grams | Nature of Gelled Product After 24 Hours |
|---|---|---|---|---|---|---|
| 17 | 66 | 19 | 46 | 46 | 3.750 | Brittle gelled solid. |
| 18 | 57 | 19 | 46 | 46 | 0.750 | Flexible gelled solid. |
| 19 | 57 | 19 | 72 | 18 | 0.375 | Do. |
| 20 | 128 | 37.5 | 46 | 46 | 1.00 | Weak gelled solid. |

Reference to the above table shows that the sodium salt of polyacrylic acid, when admixed with the polyhydric compound, water, and sodium dichromate as the oxidizing

[1] Acrysol A–5 (Rohm and Haas).

agent, gels to a firm solid. It further shows that a large amount of the dichromate tends to make the gelled solid brittle whereas a high amount of polymer and water without compensating increase in the polyhydric compound gels to a weak solid.

The gels so made when emplaced in a conduit were resistant to the flow of water therethrough. However, those made in Tests 18 and 19 were superior seals against the flow of water when compared to those made in Tests 17 and 20.

EXAMPLE 21

Approximately 145 gallons of a slurry suitable for use as a sealant against brine and water intrusion in the annulus between an earthen formation and a steel casing, which was positioned in an entrance to an underground mine, were prepared as follows:

70.9 gallons of diethylene glycol and 17.6 gallons of glycerol were blended in a 500 gallon mixer equipped with a mechanical mixing device. To the mixture of glycol and glycerol were then added 12 gallons of water in which had been dissolved 3.0 pounds of sodium dichromate dihydrate. These materials were mixed 5 minutes and then 500 pounds of linear polyacrylamide (average molecular weight of between 1,000,000 and 2,000,000) were admixed therewith at a rate of 100 pounds per minute. The resulting slurry was mixed 5 minutes and then poured into the annulus to be sealed. After 3 hours at 70° F., the slurry had set to a bluish-green, rubber-like, strong, water-resistant, solid which was efficacious for the desired sealant composition against the brine and water intrusion.

Having described my invention, what I claim and desire to protect by Letters Patent is:

1. A fluid-gelable composition comprising:
   (A) a water-soluble or colloid forming polymer selected from the class consisting of (1) substantially linear polyacrylamide, having up to 100 percent of the carboxamide groups hydrolyzed to carboxyl groups, (2) copolymers of acrylamide and another ethylenically unsaturated monomer, sufficient acrylamide being present to impart water-soluble or colloid-forming properties to said polymer when admixed with water, (3) polyacrylates, (4) polyacrylic acids and (5) mixtures of such acrylates and acid, said polymer having a molecular weight of between about 100,000 and 10,000,000;
   (B) a polyhydric compound selected from the class consisting of glycerol, alkylene glycols, polyoxyalkylene glycols, and mixtures thereof whereby a reducing agent in said solution is provided;
   (C) water; and
   (D) an oxidizing agent selected from the class consisting of water-soluble chromates and dichromates consisting of a solution-soluble hexavalent chromium compound, which yields nascent chromium ions in situ having a valence state of +3 which crosslink the water-dispersible polymer,
in amounts of each of component identified as (A) to (D) as follows:
   between 0.1 and 8.0 pounds of component (A) per gallon of total liquid present; between about 6 and 99.5 percent of component (B) based on the total weight of liquids present; between 0.5 percent and 20 percent of component (C) based on the total weight of liquid present; and at least enough of component (D) to yield $3 \times 10^{-4}$ gram atoms of trivalent chromium per gram atom of polymer present.

2. The composition of claim 1 wherein an acidic compound is admixed therewith, prior to admixture of the polymer with the water and polyhydric compounds, to lower the pH to a value not greater than 6.

3. The composition of claim 2 wherein the acidic compound employed is selected from the class consisting of HCl, $H_2SO_4$, $HNO_3$, $H_3PO_4$, acetic, oxalic and citric acids, and acid salts.

4. The composition of claim 1 wherein the polyhydric compound identified as component (2) is a mixture of glycerol, alkylene glycols and polyoxyalkylene glycols.

5. The composition of claim 1 wherein a divalent or polyvalent inorganic salt which is soluble in said liquid is present therein.

6. The composition of claim 5 wherein the amount of salt present is that necessary substantially to saturate the liquid present.

7. The composition of claim 1 wherein a particulated material of an average mesh size of less than 44 microns which inhibits loss of fluid to a porous formation is admixed therewith in an amount of between about 0.2 and about 5 pounds/gallon of liquid present.

8. The composition of claim 1 wherein the fluid loss agent is selected from the class consisting of finely pulverized $SiO_2$, $BaSO_4$, $Al_2O_3$, sand, perlite, pumice, glass, hard resins, and nutshells.

9. The method of inhibiting the flow of fluids through openings in an earthen formation comprising injecting into said opening the composition of claim 1 and allowing the composition to set to a substantially fluid-impermeable solid.

10. A shaped article of manufacture for use as a substantially fluid tight gasket consisting of the composition of claim 1 molded into the desired shape and gelled in such shape.

11. The method of sealing off an existing gap in mating or flanged metal, wood, plastic, or masonry members consisting of emplacing in such gap the fluid gelable composition of claim 1 and providing a period of time of up to at least about 15 minutes at a temperature of at least about 10° C., without appreciable disturbance of the emplaced composition, during which time said composition gels to a substantially fluid-tight seal.

12. The method of sealing off an existing gap in mating or flanged metal, wood, plastic, or masonry members consisting of emplacing in such gap the fluid gelable composition of claim 1 which contains in admixture therewith a particulated metal selected from metals above H in the electromotive series and in an amount thereof between about 0.01 to 2.0% by weight of polymer present.

13. The method of sealing off an existing gap in mating or flanged metal, wood, plastic, or masonry members consisting of emplacing in such gap the fluid gelable composition of claim 1 which contains an admixture therewith a particulated metal oxide.

References Cited

UNITED STATES PATENTS 3,114,651  12/1963  Gentile.
3,265,657  8/1966  Sinclair.

OTHER REFERENCES

C. S. Miner and N. N. Dalton, Glycerol, New York., Reinhold (1953), p. 338.

SAMUEL H. BLECH, Primary Examiner

W. J. BRIGGS, Sr., Assistant Examiner

U.S. Cl. X.R.

166—294; 252—8.55; 260—29.6, 29.7, 33.2, 33.4, 41; 277—1